United States Patent
Fujioka et al.

(10) Patent No.: US 9,733,504 B2
(45) Date of Patent: Aug. 15, 2017

(54) MOBILE COMPUTER WITH A DETACHABLE FRAME

(71) Applicant: Mattel, Inc., El Segundo, CA (US)

(72) Inventors: Robb Fujioka, Manhattan Beach, CA (US); Justin Nishiki, Hawthorne, CA (US); Douglas Quon Woo, Hermosa Beach, CA (US); Kenneth Randall, Eastvale, CA (US); John Lee, Los Altos, CA (US)

(73) Assignee: Mattel, Inc., El Segundo, CA (US)

( * ) Notice: Subject to any disclaimer, the term of this patent is extended or adjusted under 35 U.S.C. 154(b) by 306 days.

(21) Appl. No.: 14/454,624

(22) Filed: Aug. 7, 2014

(65) Prior Publication Data

US 2016/0038837 A1    Feb. 11, 2016

(51) Int. Cl.

| | |
|---|---|
| *G02F 1/1333* | (2006.01) |
| *G06F 1/16* | (2006.01) |
| *F16M 11/00* | (2006.01) |
| *A63F 13/26* | (2014.01) |
| *A63F 13/2145* | (2014.01) |
| *A63F 13/92* | (2014.01) |

(52) U.S. Cl.
CPC ....... *G02F 1/133308* (2013.01); *F16M 11/00* (2013.01); *G06F 1/166* (2013.01); *G06F 1/1626* (2013.01); *G06F 1/1628* (2013.01); *G06F 1/1688* (2013.01); *A63F 13/2145* (2014.09); *A63F 13/26* (2014.09); *A63F 13/92* (2014.09); *G06F 2200/1633* (2013.01)

(58) Field of Classification Search
CPC ....................................................... G06F 1/16
USPC ..................................................... 361/679.21
See application file for complete search history.

(56) References Cited

U.S. PATENT DOCUMENTS

2010/0090085 A1* 4/2010 Corrion ............... A47B 23/043
                                                             248/459
2011/0297566 A1* 12/2011 Gallagher ............ F16M 11/105
                                                             206/320

* cited by examiner

*Primary Examiner* — Jerry Wu
(74) *Attorney, Agent, or Firm* — Kolisch Hartwell, P.C.

(57) ABSTRACT

A mobile computer with a detachable frame is disclosed. According to one embodiment, a mobile computer system includes a tablet computer comprising a display screen and a frame. The frame is removably attached to the tablet computer. The frame is taller than the tablet computer to provide an opening between a top side of the tablet computer and the frame.

18 Claims, 7 Drawing Sheets

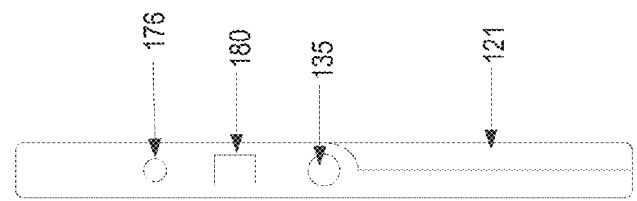
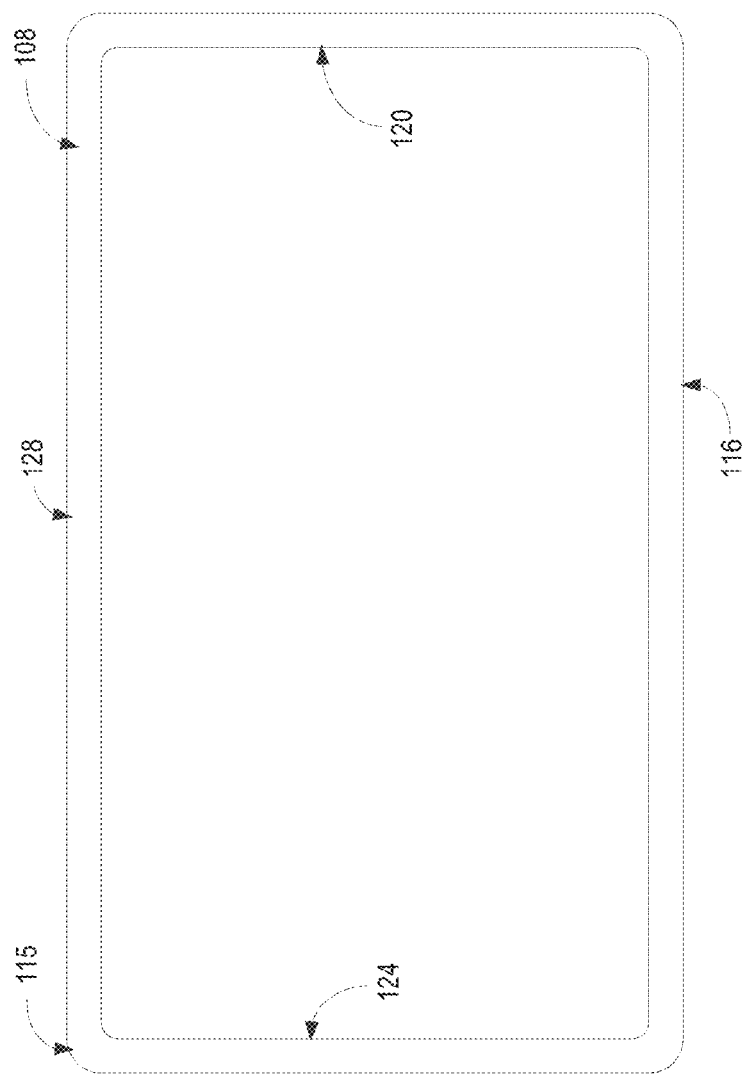

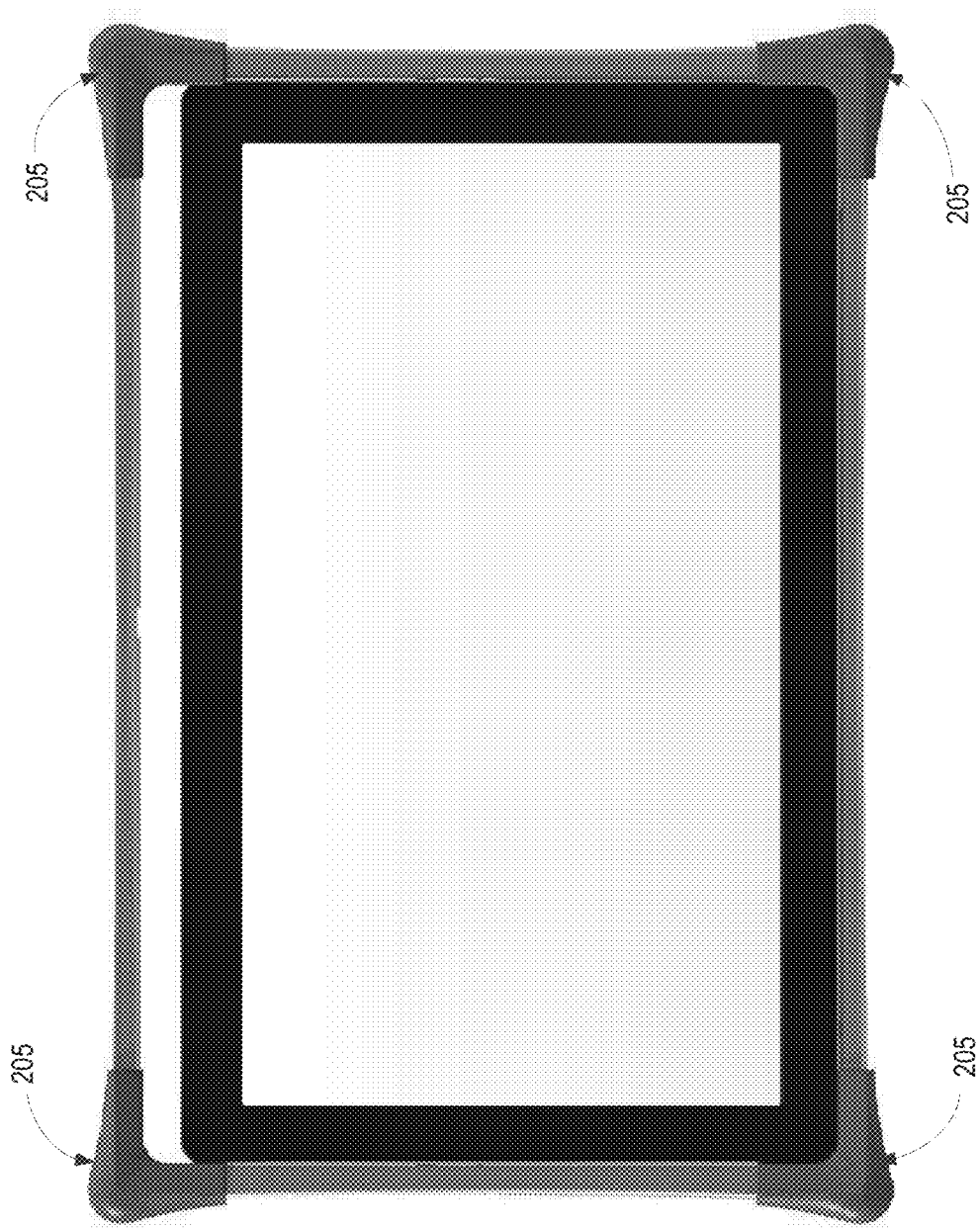

MOBILE COMPUTER WITH A DETACHABLE FRAME

FIELD

The present disclosure generally relates to a mobile computer system, and more particularly, to a mobile computer with a detachable frame that can be used in various positions and configurations.

BACKGROUND

One of the fastest growing areas in the computer industry today is the tablet computer. Despite its similar appearance to a smartphone, a tablet computer is typically characterized by a larger display screen and greater computing power. The display screen of a tablet computer is generally of a touch screen variety that enables a user to operate and interact with the tablet computer by directly touching the display screen rather than using a peripheral mouse and keyboard. Conventional tablet computers not only offer various features that are tailored for mobile computing but also provide network connectivity to the Internet via Wi-Fi or a cellular network.

A flat panel monitor generally provides a much larger display screen than that of a tablet computer and is typically designed for use with a desktop computer. A flat panel monitor is typically intended for providing a standalone display or a television set with dedicated electronics. Moreover, flat panel monitors are wall-mounted or held up with a stand placed on a surface. Due to its relatively large size and weight, a flat panel monitor is not typically designed with mobility in mind. In comparison to a flat panel monitor, a tablet computer is designed for mobile applications and equipped with more general purpose hardware including a central processing unit (CPU) and various input/output (I/O) ports such as a universal serial bus (USB), a high-definition multimedia interface (HDMI) and an external display port. A tablet computer runs an operating system (OS) such as OS X® or ANDROID®. While a tablet computer with a display size comparable to a flat panel monitor is desired for certain applications, such a tablet computer is not optimized for providing a mobile computing environment and multiple user applications and interactions.

SUMMARY

A mobile computer with a detachable frame is disclosed. According to one embodiment, a mobile computer system includes a tablet computer comprising a display screen and a frame. The frame is removably attached to the tablet computer. The frame is taller than the tablet computer to provide an opening between a top side of the tablet computer and the frame.

According to one embodiment, a mobile computer includes a display screen and a plurality of input/output (I/O) ports. The mobile computer is configured to be positioned flat on a surface with the display screen facing up and run an application for a plurality of players. Each of the plurality of players has a dedicated I/O port selected from the plurality of I/O ports.

According to one embodiment, a mobile computer is configured to provide a private hand for a player of a plurality of players in a computer game in response to an action by the player. The private hand is not visible to other players of the plurality of players during the computer game.

According to one embodiment, a mobile computer has four sides, a display screen having a one to one aspect ratio, and a user interface configured to be displayed on the display screen. The user interface is symmetric to a plurality of users of the mobile computer, each of the plurality of users sits on each side of the four sides.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the various embodiments of the present disclosed system and method and together with the general description given above and the detailed description of the preferred embodiment given below serve to explain and teach the principles of the present disclosure.

FIG. 6A illustrates a front view of an exemplary detachable frame, according to one embodiment;

FIG. 6B illustrates a side view of an exemplary detachable frame, according to one embodiment;

FIG. 7 illustrates a front view of an exemplary tablet computer with a detachable frame and corner protective bumpers, according to one embodiment.

Figure 1:
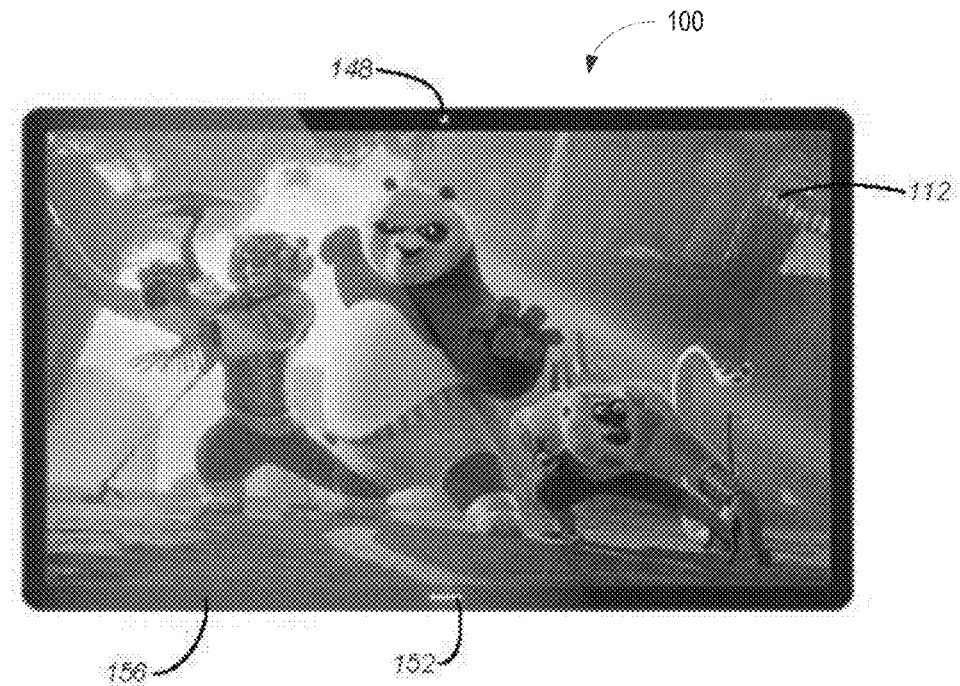
FIG. 1 illustrates a front view of an exemplary tablet computer, according to one embodiment.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the claims.

DETAILED DESCRIPTION

A mobile computer with a detachable frame is disclosed. According to one embodiment, a mobile computer system includes a tablet computer comprising a display screen and a frame. The frame is removably attached to the tablet computer. The frame is taller than the tablet computer to provide an opening between a top side of the tablet computer and the frame.

According to one embodiment, a mobile computer includes a display screen and a plurality of input/output (I/O) ports. The mobile computer is configured to be positioned flat on a surface with the display screen facing up and run an application for a plurality of players. Each of the plurality of players has a dedicated I/O port selected from the plurality of I/O ports.

According to one embodiment, a mobile computer is configured to provide a private hand for a player of a plurality of players in a computer game in response to an action by the player. The private hand is not visible to other players of the plurality of players during the computer game.

According to one embodiment, a mobile computer has four sides, a display screen having a one to one aspect ratio, and a user interface configured to be displayed on the display screen. The user interface is symmetric to a plurality of users of the mobile computer, each of the plurality of users sits on each side of the four sides.

In the following description, for purposes of clarity and conciseness of the description, not all of the numerous components shown in the schematic are described. The numerous components are shown in the drawings to provide a person of ordinary skill in the art a thorough enabling disclosure of the present system and method. The operation of many of the components would be understood to one skilled in the art.

Each of the additional features and teachings disclosed herein can be utilized separately or in conjunction with other features and teachings to provide a detachable frame for a mobile computer. Representative examples utilizing many of these additional features and teachings, both separately and in combination, are described in further detail with reference to the attached drawings. This detailed description is merely intended to teach a person of skill in the art further details for practicing preferred aspects of the present teachings and is not intended to limit the scope of the present disclosure. Therefore, combinations of features disclosed in the following detailed description may not be necessary to practice the teachings in the broadest sense and are instead taught merely to describe particularly representative examples of the present teachings.

Moreover, various features of the representative examples and the dependent claims may be combined in ways that are not specifically and explicitly enumerated in order to provide additional useful embodiments of the present teachings. In addition, it is expressly noted that all features disclosed in the description and/or the claims are intended to be disclosed separately and independently from each other for the purpose of original disclosure, as well as for the purpose of restricting the claimed subject matter independent of the compositions of the features in the embodiments and/or the claims. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to help understand how the present teachings are practiced but are not intended to limit the dimensions and the shapes shown in the examples.

According to one embodiment, the present detachable frame is designed to fit various mobile devices and tablet computers. In one embodiment, the present detachable frame is designed to fit NABI®-series or DREAMTAB®-series tablet computers manufactured by Fuhu, Inc. of El Segundo, Calif. The present detachable frame for a tablet computer may share partially common design and functional elements to provide a unique brand identity. According to one embodiment, the present detachable frame functions as a handle of a tablet computer when attached to the tablet computer and a folding stand when configured to position a display of the tablet computer at a desired position and angle.

According to one embodiment, the present mobile computer system and applications running on the present mobile computer system is designed for children. Children may learn, study, and draw on the present mobile computer using a finger or a pen on a touch-sensitive screen. The present mobile computer system provides a user experience that is specifically tailored for a target age group by providing characters, animations, video tutorials, and interactive lessons. An application running on the present mobile computer system may include an integrated parental control.

According to one embodiment, the present mobile computer system provides an environment for children to learn how to use and behave on a social networking platform that is managed and monitored by parents. Each child on the social networking platform has a unique identification (ID) and connects with trusted family members to share their creations, activities, and photos through email, instant messenger (IM), and photo sharing.

In the following description, numerous specific details are set forth in order to provide a thorough understanding of the present disclosure. It will be apparent, however, to one of ordinary skill in the art that the present disclosure may be practiced without these specific details. In other instances, well known components or methods have not been described in detail but rather in a block diagram, or a schematic, in order to avoid unnecessarily obscuring the present disclosure. Further specific numeric references such as "first component," may be made. However, the specific numeric reference should not be interpreted as a literal sequential order but rather interpreted that the "first component" is different than a "second component." Thus, the specific details set forth are merely exemplary. The specific details may be varied from and still be contemplated to be within the spirit and scope of the present disclosure. The term "coupled" is defined as meaning connected either directly to the component or indirectly to the component through another component.

In one embodiment, the present disclosure describes a tablet computer that has a display screen that is larger than that of a conventional tablet computer, for example, 20 or 24 inches or larger. The tablet computer includes one or more navigation controls, one or more status indicators, and a non-transitory machine-readable storage medium that stores instructions. The tablet computer runs an operating system (OS) that enables an end-user to interact with the tablet computer by way of the navigation controls. At least a portion of the operating system is stored on a non-transitory machine-readable storage medium. The tablet computer has a display monitor, a network receiver, and an encasement that houses internal electronics of the tablet computer and other peripheral devices such as a Wi-Fi receiver, a Bluetooth receiver, an Infrared (IR) code reader, a near-field communication (NFC) receiver, and speakers.

In an embodiment, the present tablet computer accepts a detachable frame. The detachable frame includes a bottom member, side members, and a top member that are configured to cooperatively provide a structural support and protection to the tablet computer while functioning as a tilting stand and a carrying handle. The detachable frame leaves the display of the tablet computer unobstructed while supporting the tablet computer in a desired viewing position. The bottom member is configured to support the weight of the tablet computer when the tablet computer stands on a flat horizontal surface, such as a table or a desk. The side members of the detachable frame are taller than a side length of the tablet computer, such that the detachable frame has an open spacing above the display, thereby allowing access to various ports of the tablet computer.

FIG. 1 illustrates a front view of an exemplary tablet computer, according to one embodiment. The tablet computer 100 has a processor, one or more navigation controls, and a wireless data communication interface. The tablet computer 100 also includes a non-transitory machine-readable storage medium that is configured to store instructions. The processor executes the instructions and performs operations according to the instructions. In some embodiments, the software used to facilitate the operating system (OS) may be embodied onto the non-transitory machine-readable medium. Generally, a machine-readable medium includes any mechanism that stores information in a form readable by a machine (e.g., a computer). For example, a machine-readable medium includes a read only memory (ROM), a random access memory (RAM), a magnetic disk storage media, an optical storage media, a flash memory device; a digital video disc (DVD, an erasable programmable ROM (EPROM), electrically erasable ROM (EEPROM), a magnetic or optical card, or any type of media suitable for storing electronic instructions. In some embodiments, the operating system may be stored at least in part on the non-transitory machine-readable storage medium. The operating system executes the instructions that enable a user to interact with the tablet computer 100 using a navigational control.

The tablet computer 100 includes a display screen 112, a camera 148, and a front name plate 152. In one embodiment, the display screen 112 is larger than a screen of a conventional personal tablet computer, for example, 20 or 24 inches. The display screen 112 may be of the thin film transistor liquid crystal display (TFT-LCD) variety and may be protected by a glass panel. In one embodiment, the glass panel has shock-resistant properties and is back-painted so as to form a screen border 156 around the periphery of the display screen 112. It will be appreciated that the screen border 156 may advantageously hide internal components of the tablet computer 100 while providing an aesthetic appeal. The display screen 112 is adequately sized for a personal use as well as for a multiple user application.

In one embodiment, the front name plate 152 may be used for branding purposes, for example, to display the model name of the tablet computer 100. In another embodiment, the front name plate 152 is used to display various types of icons, for example, an alphabet, a number, a symbol, a movie character, a cartoon character, a sports figure, a company logo, a sports team logo, a story character, an inspirational quote, a Bible verse, and a slogan.

The tablet computer 100 includes a network receiver that enables wireless operation of the tablet computer by transmitting commands from a remote control that is associated with the tablet computer 100. In one embodiment, the internal circuitry within the tablet computer 100 is configured to receive and process various signals such as IR codes, NFC signals, and/or images received by the camera 148. In one embodiment, the internal circuitry is configured to support various wireless protocols (e.g., Bluetooth, Institute of Electrical and Electronics Engineer (IEEE) 802.11 a/b/g/n standards) and facilitate a wireless communication between the tablet computer 100 and an external wireless adapter.

Figure 2:
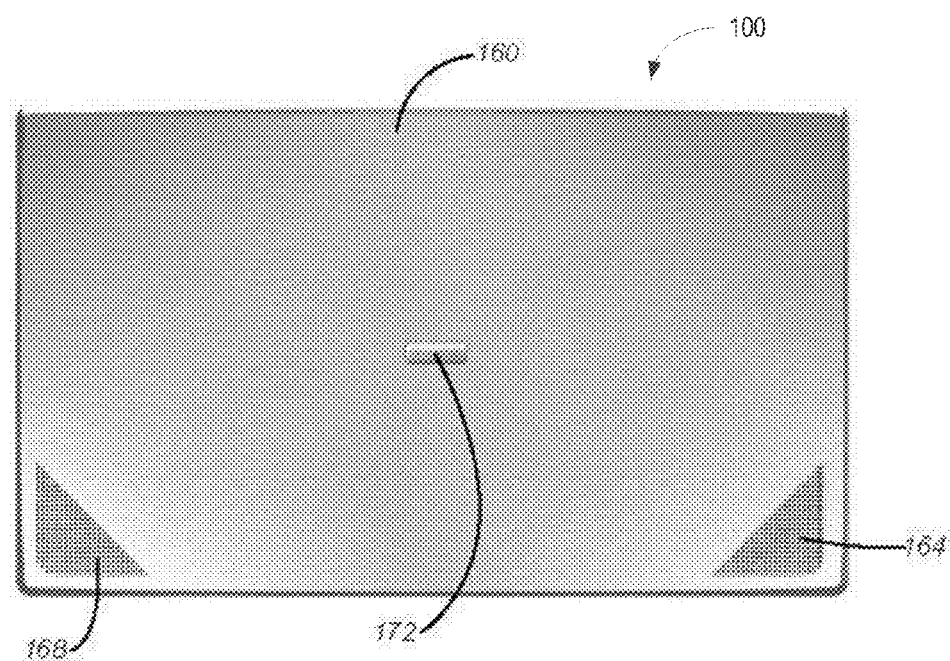
FIG. 2 illustrates a rear view of an exemplary tablet computer, according to one embodiment.

FIG. 2 illustrates a rear view of an exemplary tablet computer, according to one embodiment. The tablet computer 100 is encased within an envelope 160. In one embodiment, the envelope 160 is made of a thin, metallic material (e.g., brushed aluminum) so as to protect the internal electronics of the tablet computer 100. In another embodiment, the envelope 160 is made of a non-metallic material (e.g., hard plastic) that is capable of protecting the internal electronics of the tablet computer 100. In one embodiment, the center portion of the rear surface of the tablet computer 100 is concaved such that when the tablet computer 100 is laid on a flat surface, only the periphery of the rear surface touches the flat surface. The concavity of the rear surface also provides improved sound projection from speakers that are mounted on the corners of the rear surface and air flow for cooling the tablet computer 100. If liquid is accidentally spilled on the flat surface below the tablet computer, the spillage may be easily cleaned as it does not extend to the entire rear surface.

On the rear side of the tablet computer 100, there are grills 164 and 168 that are disposed on opposite sides. The grills 164 and 168 provide structural protection to the internal speakers of the tablet computer 100 while allowing unobstructed transmission of sound from the internal speakers. The speakers that are positioned on opposite sides of the tablet computer 100 facilitate providing stereo quality sound. The envelope 160 further comprises a rear name plate 172. The rear name plate 172 may be used for branding purposes, such as to display the model name of the tablet computer 100. In another embodiment, the rear name plate 172 may be used to display an icon, an alphabet, a number, a symbol, a movie character, a cartoon character, a sports figure, a company logo, a sports team logo, a story character, an inspirational quote, a Bible verse, and a slogan.

Figure 3:
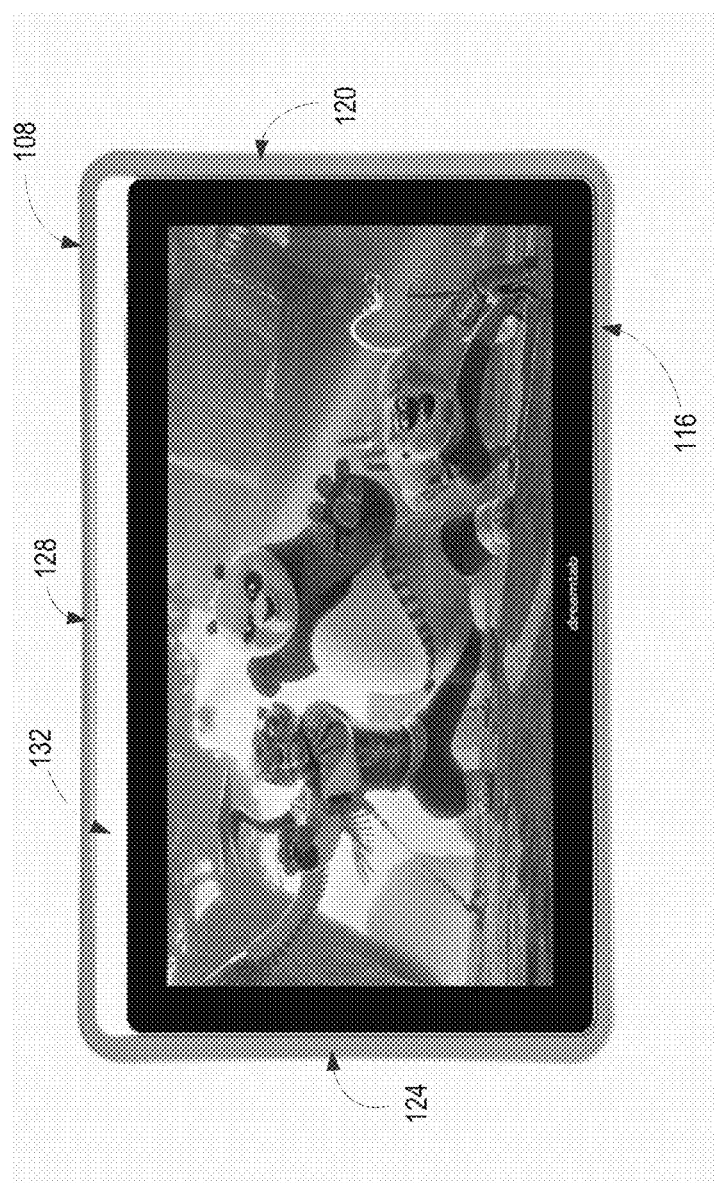
FIG. 3 illustrates a front view of an exemplary tablet computer with a detachable frame, according to one embodiment.

FIG. 3 illustrates a front view of an exemplary tablet computer with a detachable frame, according to one embodiment. The detachable frame 108 supports the tablet computer 100 and places the tablet computer 100 in an optimal position for viewing. The detachable frame 108 also provides protection to the tablet computer 100 when the tablet computer 100 is positioned at an angle, when the tablet computer 100 is carried by a user, or when the tablet computer 100 is laid flat on a horizontal surface, such as a table or a desk. A flat lie-down configuration is useful in situations where multiple users are simultaneously using the tablet computer 100, for example, when the tablet computer 100 is being used as a gaming platform.

The detachable frame 108 includes a bottom member 116, side members 120 and 124, and a top member 128. The bottom member 116 supports the weight of the tablet computer 100 when the tablet computer 100 is positioned at an angle. The detachable frame 108 includes various openings to provide access to peripherals that might be connected to the tablet computer 100. The side members 120 and 124 have a length exceeding a side length of the tablet computer 100, such that the detachable frame 108 has an open spacing 132 between the top of the tablet computer 100 and the detachable frame 108. In one embodiment, the top member 128 operates as a handle to allow a user to carry the tablet computer 100.

In one embodiment, the bottom member 116 has a spacing that is similar to the top spacing 132. The incorporation of a space at the bottom member 116 allows a user to slide a keyboard or a peripheral under the tablet computer 100 and provide more desk space in front of the tablet computer 100. Those skilled in the art would recognize that providing a space below the tablet computer 100 is particularly useful for a constrained desk space.

In one embodiment, the detachable frame 108 is made of a metallic material (e.g., aluminum, and brushed nickel). The metallic material imparts an aesthetic appeal and strength necessary to support the weight of the tablet computer 100 without bowing, bending, flexing, or otherwise being deformed. In another embodiment, the detachable frame 108 is made of various nonmetallic materials with structural rigidity necessary for supporting the weight of the tablet computer 100.

Figure 4:
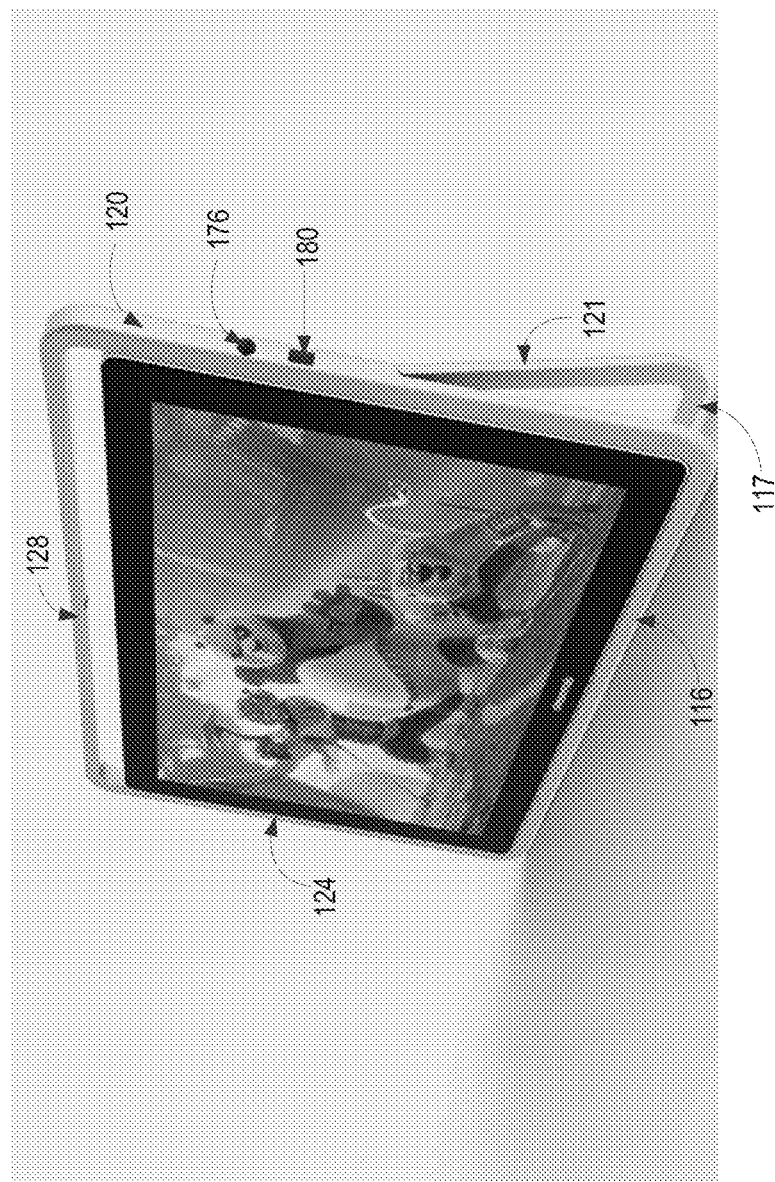
FIG. 4 illustrates a front perspective view of an exemplary tablet computer with a detachable frame, according to one embodiment.

FIG. 4 illustrates a front perspective view of an exemplary tablet computer with a detachable frame, according to one embodiment. The tablet computer 100 includes various types of ports 176 and 180 that are suitably configured to interface with a variety of external devices. In one embodiment, the port 176 or 180 of the tablet computer 100 includes a micro Universal Serial Bus (USB) port to connect a peripheral device and/or an interface for a micro Secure Digital (SD) card to transfer photographs and video data files. The tablet computer 100 may be powered from an external power source via a dedicated power adapter port or the micro USB port. In another embodiment, the port 176 or 180 includes a mini high-definition multimedia interface (HDMI) port. It will be appreciated by those skilled in the art that the mini HDMI port enables a user to connect the tablet computer 100 to an external digital device such as a digital camera, a camcorder, a video game console, a cable television system, a satellite television system, and other types of digital devices that are compliant with mini-HDMI standard. The tablet computer 100 provides a firmware that supports a wide variety of external digital devices. According to one embodiment, there is at least one data port on each side of the tablet computer 100 such that multiple users can connect and use his/her own external device when they are playing a multiple user game or an application that allows multiple user participation (e.g., a board game such as Scrabble, and a poker game).

According to one embodiment, the tablet computer 100 is configured to facilitate games with a private hand for each player. In one embodiment, a cover accessory is placed on the screen of the tablet computer 100 near each side to block the private hand shown on the screen of the tablet computer 100 such that the private hand is visible only from one side. In another embodiment, each user is provided with an encoding scheme that is used to encode a private hand uniquely for each user. The encoded hands may be displayed on the screen of the tablet computer 100 but can be decoded or understood only by the designated user. It is understood that various encoding schemes may be used without deviating from the scope of the present disclosure.

In yet another embodiment, a user takes an action of covering the private hand displayed on the screen of the tablet computer 100. For example, touching a designated area on the screen of the tablet computer 100 in a specified way reveals the private hand to the designated user temporarily. During a play of a game, a button may be provided on the touch screen of the tablet computer 100 for each user. The designated user pushes the button to reveal the private hand temporarily. In another embodiment, an individual display is connected to each of the peripheral connector or wirelessly connected to the tablet computer 100. The individual display may be vertically oriented for each player such that the private hand is visible only to the designated user. In another embodiment, each user uses another portable device such as a tablet computer or a smartphone, linked to the tablet computer 100 to see the private hand while hiding it from other users.

According to one embodiment, the tablet computer 100 is used in various configurations. Examples of such configurations include a lying-flat position on a surface and a standing-up position. In the lying-flat position, a group of users can interact simultaneously with the tablet computer 100. For example, four users sit on each side of the tablet computer 100 and play a game. In this case, the tablet computer 100 provides symmetric and equivalent functionalities to all four users using a peripheral connector located on each of the four sides of the tablet computer 100 (e.g., USB port, a proprietary data port). According to one embodiment, the tablet computer 100 has two or more power connectors on at least two different sides to facilitate routing of a power cord when the tablet computer 100 is lying on a flat surface.

According to one embodiment, the tablet computer 100 is made to be square having the equal length or width on all four sides. In this case, the display aspect ratio is 1:1, and the tablet computer 100 provides symmetric interface to the users on each side. Because the aspect ratio is equal on all four sides, the content displayed on the screen of the tablet computer 100 remains unchanged irrespective of the orientation. According to another embodiment, the tablet computer 100 may have to display content that has a conventional 16:9 aspect ratio. In this case, the content can be displayed on a portion of the square screen, and the remaining portion is used to provide controls, captions, and an interface to receive user interaction inputs, etc.

When the tablet computer 100 is in a standing-up position, content displayed on the screen is naturally oriented vertically. When the tablet computer 100 is in a lying-flat position, a manual screen rotation is facilitated when a button on the screen is pushed to rotate the orientation of displayed content on the screen 90 degrees. In one embodiment, a gesture input from a user indicating a vector of orientation change or a target position triggers the change of orientation of displayed content.

Figure 5:
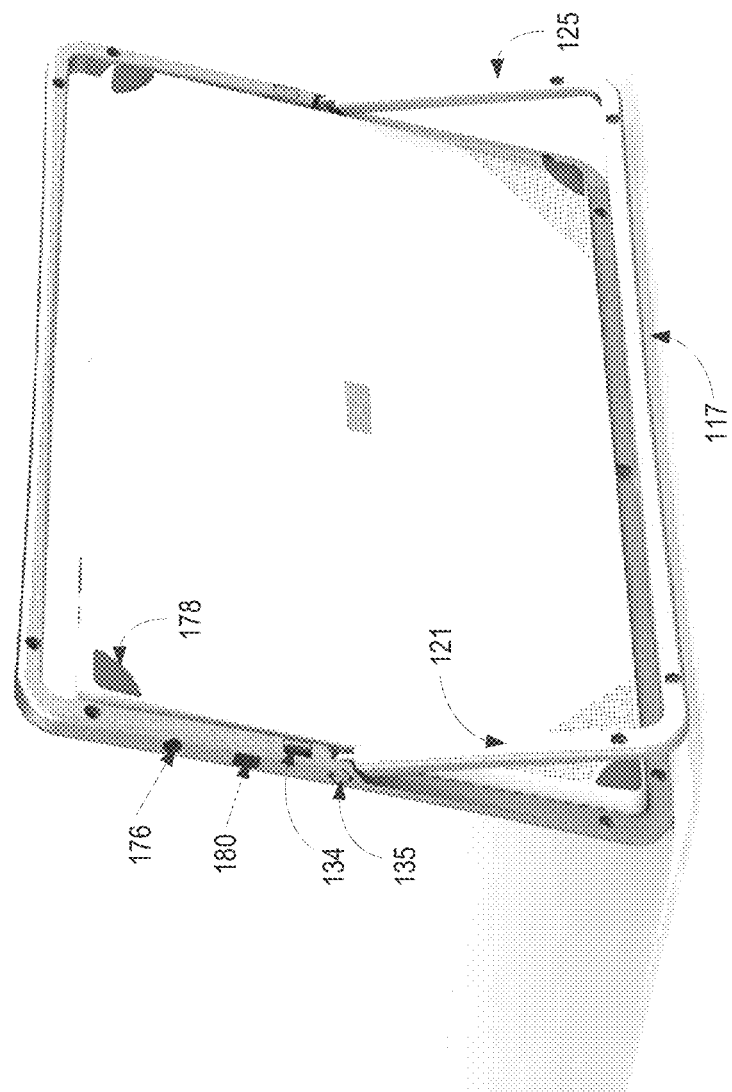
FIG. 5 illustrates a rear perspective view of an exemplary tablet computer with a detachable frame, according to one embodiment.

FIG. 5 illustrates a rear perspective view of an exemplary tablet computer with a detachable frame, according to one embodiment. The detachable frame 108 has hinges 135 on each side that allow side supports 121 and 125 of the side member 120 and 124 and a bottom support 117 of the bottom member 116 to split out from the detachable frame 108. The bottom support 117 folds out from the bottom member 116 and is placed at an angle to form a stand for the detachable frame 108. According to one embodiment, the folding stand is placed at a desirable angle and is held by a rotational friction of the hinges 135. In another embodiment, the folding stand is locked in one or more predetermined positions.

In one embodiment, the tablet computer 100 has a recessed opening on one or both sides that is configured to receive a spring-loaded locking mechanism 134 of the detachable frame 108. The locking mechanism of the detachable frame 108 is spring-loaded and is snapped into the recessed openings of the tablet computer 100. A tab of the spring-loaded locking mechanism 134 is latched to release the tablet computer 100 from the detachable frame 108. It will be appreciated that other types of fasteners or locking mechanisms may be utilized to attach the detachable frame 108 to the tablet computer 100. The tablet computer 100 includes a protective pad 178 on each of the four corners of a rear surface 182 to provide cushion when the tablet computer 100 is laid on a flat surface.

According to one embodiment, the bottom support 117 is configured to rest upon a flat horizontal surface such as a table or a desk. The bottom support 117 has a smooth, rounded cross-sectional shape and supports the tablet computer 100. In one embodiment, one or more soft feet may be attached on the bottom side of the bottom support 117 to provide stability of the tablet computer 100 positioned at an angle and protect the surface on which the tablet computer 100 is placed. The side supports 121 and 125 are configured to be disposed at an angle relative to the side members 120 and 124 so as to support the tablet computer 100 at a desired viewing position. The side supports 121 and 125 and the bottom support 117 can be retracted to a closed state or a folded state where the detachable frame 108 is flush with the rear side of the tablet computer 100. Those skilled in the art would appreciate that other shapes, sizes and forms of hinges and split mechanisms may be implemented without deviating from the scope of the present disclosure. In one embodiment, the folding stand may be manually operated by a user. Those skilled in the art would recognize that various folding mechanisms and other suitable hardware (e.g., a spring, a damper, and a friction surface) may be incorporated to facilitate manual operation.

FIG. 6A illustrates a front view of an exemplary detachable frame, according to one embodiment. The detachable frame 108 includes rounded corners 115. FIG. 6B illustrates a side view of an exemplary detachable frame, according to one embodiment. The tablet computer that the detachable frame 108 is attached to may have a power adapter port that is suitably configured to receive a power adapter cord to receive electrical power from an external power source. In one embodiment, the power adapter port is configured to receive direct current (DC) at 5.0 volts (V) from the power adapter. In another embodiment, the power adapter is configured to receive alternating current (AC) at between substantially 100V and 240V from the power outlet. The power adapter port is located on a side of the tablet computer 100 such that the tablet computer 100 can be connected to an external power source when it is lying flat and being used as a gaming platform. The detachable frame 108 has a corresponding opening for each of the available ports of the tablet computer 100 to provide an access to the corresponding ports.

According to one embodiment, a power button is positioned on a surface of the tablet computer 100. In one embodiment, the power button enables a user to turn the tablet computer 100 on and off. The tablet computer 100 further includes a volume control button that is positioned on a side. The volume control button enables a user to raise and lower the level of audible sound transmitted by the internal speakers of the tablet computer 100. It will be appreciated by those skilled in the art that in some embodiments, the functionality of the power and volume control buttons may be controlled by a remote control. It will be appreciated that other functions and features for various controls such as display settings, sound settings, a power status indicator and a touch sensitivity control may be incorporated into the tablet computer 100 without deviating from the spirit and scope of the present disclosure.

In one embodiment, the tablet computer 100 has an internal battery. The internal battery is of a thin sheet type such that it is conveniently packaged within a limited internal space of the tablet computer 100. The tablet computer 100 may eventually require an external power to run an application without an interruption but the internal battery facilitates moving the tablet computer 100 from one location to another location without losing power or having to turn off and turn on again after transition and reconnecting power. The internal battery further allows a user a period of time to save tasks on the tablet computer 100 when there is an unexpected power outage.

In one embodiment, the tablet computer 100 has an audio port that is configured to connect to an external speaker system. It is envisioned that the tablet computer 100 may be configured to disable the internal speakers when the external speakers are plugged into the tablet computer 100. In some embodiments, the tablet computer 100 may include settings that enable a user to control the operation of the internal speakers when the external speakers are plugged into the tablet computer 100.

In one embodiment, the tablet computer 100 has a headphone jack to plug in an external headphone. It is envisioned that when an external headphone is plugged into the headphone jack, audible sounds that are otherwise transmitted to the internal speakers are instead transmitted to the external headphone. In one embodiment, the headphone is a 3.5 mm standard audio jack. In another embodiment, the headphone jack is configured to drive an external active speaker system that is larger and/or more powerful than the internal speakers of the tablet computer 100. A wide variety of uses, configurations, and alternative forms of the headphone jack will be apparent to those skilled in the art without deviating from the present disclosure.

FIG. 7 illustrates a front view of an exemplary tablet computer with a detachable frame and corner protective bumpers, according to one embodiment. The corner protective bumpers 205 are secured to the detachable frame 108. The corner protective bumpers 205 may be secured to the detachable frame 108 with a pair of plastic screws or stretched to slide in the conforming rounded corners 115 of the tablet computer 100. According to one embodiment, the corner protective bumpers 205 are made of silicon and provide protection for the fragile parts of the tablet computer 100 that are most likely to be damaged when dropped. The plastic screws may be made of the same material of the corner protective bumpers 205. The protective bumpers may be provided in various sizes, thicknesses, materials, colors, and designs for user's selection.

According to another embodiment, the corner protective bumpers 205 are interchangeable to provide a mix and match of colors depending on a personalization of the tablet computer 100, characters, or motifs shown on a front face name plate. According to one embodiment, the front name plate provides personalization of the tablet computer 100 by providing a sticker and/or a skin for different characters or motifs.

Figure 8:
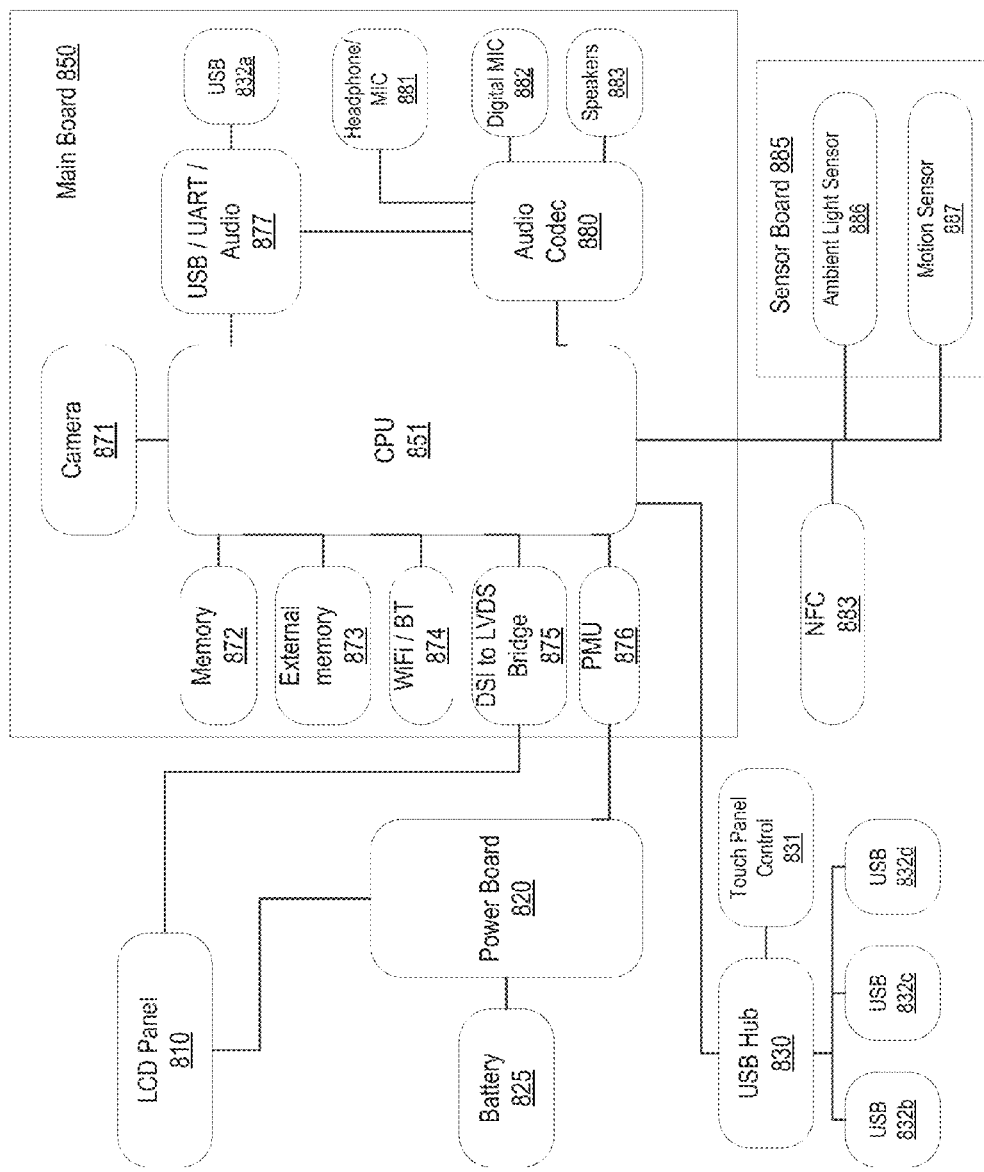
FIG. 8 illustrates a schematic diagram of a tablet computer, according to one embodiment.

FIG. 8 illustrates a schematic diagram of a tablet computer, according to one embodiment. The tablet computer includes a main board 850, a liquid crystal display (LCD) panel 810, a battery 825, a power board 820, a USB hub 830, a near field communication (NFC) module 883, and a sensor board 885. The main board 850 includes a CPU 851, various system components, and peripheral controllers such as a camera 871, a system memory 872 (e.g., double data rate random access memory (DDR RAM)), an external memory 873 (e.g., embedded multimedia card (eMMC)), a WiFi/Bluetooth chip 874, a display serial interface (DSI) to low-voltage differential signaling (LVDS) bridge 875, a power management unit (PMU) 876, a universal serial bus (USB)/universal asynchronous receiver/transmitter (UART) and audio chip 877 and an audio codec 880. The LCD panel 810 is connected to the DSI to LVDS bridge 875 as well as the power board 820 for backlight control. The battery 825 provides power to the main board 850 via the power board 820 as well as the LCD panel 810. The USB/UART/Audio chip 877 has a main USB port 832a while the USB hub 830 has additional USB ports 832b-832d as well as a touch panel control 831. The audio codec 880 connects to a headphone/microphone 881, a digital microphone 882, and speakers 883. The near field communication (NFC) module 883 and the sensor board 885 including ambient light sensor 886 and motion sensor 887 (e.g., three axis accelerometer) communicate with the CPU 851 via an inter-integrated circuit ($I^2C$) bus.

While some specific embodiments of the present disclosure have been shown, the present disclosure should not be interpreted to limit the scope of the present disclosure to these embodiments. For example, most functions performed by electronic hardware components may be duplicated by software emulation. Thus, a software program written to accomplish those same functions may emulate the functionality of the hardware components in input-output circuitry. The present disclosure is to be understood as not limited by the specific embodiments described herein, but only by scope of the appended claims.

Embodiments as described herein have significant advantages over previously developed implementations. As will be apparent to one of ordinary skill in the art, other similar apparatus arrangements are possible within the general scope. The embodiments described above are intended to be exemplary rather than limiting, and the bounds should be determined from the claims.

What is claimed is:

1. A mobile computer system comprising: a tablet computer comprising a display screen; and a frame that is removably snapped to the tablet computer, the frame comprises a hinge to allow a bottom support to fold out and form a stand; and the frame includes a bottom member, side members, and a top member; when the table computer is disposed between the side members, (1) the detachable frame has a first opening along substantially an entire length of the top member between a top edge of the tablet computer and the top member as a handle for a user and (2) the bottom member contacts a bottom edge of the tablet computer along substantially an entire length of the bottom member.

2. The mobile computer system of claim 1, wherein the frame is fixedly snapped into the tablet computer using a locking mechanism.

3. The mobile computer system of claim 2, wherein the locking mechanism is spring-loaded.

4. The mobile computer system of claim 3, wherein the locking mechanism is unlocked when a tab of the spring-loaded locking mechanism is latched.

5. The mobile computer system of claim 2, wherein the frame is switched between an open state and a closed state.

6. The mobile computer system of claim 1, wherein the frame is made of a material to provide structural rigidity and support for the weight of the tablet computer without bowing, bending, flexing, or otherwise becoming deformed.

7. The mobile computer system of claim 6, wherein the material is aluminum.

8. The mobile computer system of claim 1, wherein the display screen comprises a liquid crystal display (LCD) and a glass surround, and where the glass surround forms a border around the display screen.

9. The mobile computer system of claim 1, wherein the tablet computer further comprises a wireless network receiver that is configured to enable wireless operation of the tablet computer.

10. The mobile computer system of claim 9, wherein the wireless network receiver is compliant with Bluetooth.

11. The mobile computer system of claim 9, wireless network receiver is compliant with Institute of Electrical and Electronics Engineers' (IEEE) 802.11 a/b/g/n standards.

12. The mobile computer system of claim 1, wherein the tablet computer further comprises an Infrared (IR) code reader that is configured to receive and interpret an IR code.

13. The mobile computer system of claim 1, wherein the tablet computer further comprises a name plate that is configured for displaying a model name of the tablet computer.

14. The mobile computer system of claim 1, wherein the tablet computer comprises a port that is suitably configured to interface with an external device.

15. The mobile computer system of claim 14, wherein the port comprises a micro Universal Serial Bus (USB) port.

16. The mobile computer system of claim 1, wherein the port comprises a mini high-definition multimedia interface (HDMI) port.

17. The mobile computer system of claim 1, further comprising corner protective bumpers that are secured to the detachable frame.

18. The mobile computer system of claim 1, wherein the tablet computer includes a plurality of ports, and wherein the detachable frame includes a plurality of openings that corresponds to the plurality of ports.

* * * * *